United States Patent
Hung et al.

(10) Patent No.: US 8,935,545 B2
(45) Date of Patent: Jan. 13, 2015

(54) POWER GENERATOR IN A COMPUTER APPARATUS GENERATING A POWER STABLE SIGNAL ACCORDING TO A RECEIVED POWER PULSE SIGNAL

(75) Inventors: Shang-Yu Hung, Taipei (TW);
Chih-Ching Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 248 days.

(21) Appl. No.: 13/477,061

(22) Filed: May 22, 2012

(65) Prior Publication Data

US 2012/0303979 A1    Nov. 29, 2012

Related U.S. Application Data

(60) Provisional application No. 61/490,087, filed on May 26, 2011.

(51) Int. Cl.
| | |
|---|---|
| *G06F 1/00* | (2006.01) |
| *G06F 1/24* | (2006.01) |
| *G06F 1/26* | (2006.01) |
| *G06F 1/32* | (2006.01) |

(52) U.S. Cl.
CPC .. *G06F 1/24* (2013.01); *G06F 1/26* (2013.01); *G06F 1/3203* (2013.01)
USPC ........................................................ 713/300

(58) Field of Classification Search
CPC .................................................... G06F 1/3203
See application file for complete search history.

(56) References Cited

U.S. PATENT DOCUMENTS

| | | | | |
|---|---|---|---|---|
| 5,513,218 | A | * | 4/1996 | Moller .......................... 375/257 |
| 5,767,844 | A | * | 6/1998 | Stoye ............................ 345/212 |
| 7,514,958 | B1 | | 4/2009 | Zhou et al. |
| 7,812,765 | B2 | * | 10/2010 | Kim et al. ................ 342/357.74 |
| 7,917,783 | B2 | | 3/2011 | Luo et al. |
| 2006/0075267 | A1 | * | 4/2006 | Tokue ........................... 713/300 |
| 2006/0176088 | A1 | * | 8/2006 | Fujiu et al. .................... 327/143 |
| 2009/0119526 | A1 | | 5/2009 | Liu et al. |
| 2010/0262849 | A1 | * | 10/2010 | Chan et al. .................... 713/320 |

FOREIGN PATENT DOCUMENTS

| | | |
|---|---|---|
| CN | 101387873 | 3/2009 |
| CN | 101430594 | 5/2009 |
| TW | 200912624 | 3/2009 |
| TW | 200921358 | 5/2009 |

\* cited by examiner

*Primary Examiner* — Thomas Lee
*Assistant Examiner* — Gayathri Sampath
(74) *Attorney, Agent, or Firm* — Jianq Chyun IP Office

(57) ABSTRACT

A power generator adaptive to a computer apparatus is provided. The power generator includes a logic operating unit, a power converting module, and a power management module. The logic operating unit receives a power pulse signal generated by a power button when the power button is pressed. The logic operating unit generates a power enabling signal according to the power pulse signal. The power converting module receives the power enabling signal and generates an internal voltage by converting an external voltage according to the power enabling signal. The power management module receives the internal voltage and the power pulse signal, and latches a generating state of the internal voltage according to the power pulse signal to generate a power stable signal. The power management module further provides the power stable signal to the logic operating unit to maintain a generating state of the power enabling signal.

10 Claims, 2 Drawing Sheets

POWER GENERATOR IN A COMPUTER APPARATUS GENERATING A POWER STABLE SIGNAL ACCORDING TO A RECEIVED POWER PULSE SIGNAL

CROSS-REFERENCE TO RELATED APPLICATION

This application claims the priority benefits of U.S. provisional application Ser. No. 61/490,087, filed on May 26, 2011. The entirety of the above-mentioned patent application is hereby incorporated by reference herein and made a part of this specification.

BACKGROUND OF THE INVENTION

1. Field of the Invention

The invention relates to a power generator. Particularly, the invention relates to a power generator adapted to a computer apparatus.

2. Description of Related Art

In the conventional technique, a power generator in a computer apparatus generally provides a power enabling signal through, for example, an embedded controller to control generation of power required by the computer apparatus. The method of using the embedded controller to generate the power enabling signal can be implemented by an original embedded controller in the computer apparatus, or an additional embedded controller can be used to specifically provide the power enabling signal.

Certainly, if the original embedded controller in the computer apparatus is used to provide the power enabling signal, a part of system resources of the original embedded controller is assumed, which may influence an operating efficiency of the embedded controller. Moreover, if the additional embedded controller is used to specifically provide the power enabling signal, additional circuit cost is required, which decreases a price competitiveness of the computer apparatus.

SUMMARY OF THE INVENTION

The invention is directed to a power generator, which is capable of providing an effective power enabling signal through a simple logic operating unit.

The invention is directed to a computer apparatus including the aforementioned power generator, which is capable of providing an effective power enabling signal through a simple logic operating unit.

The invention provides a power generator adaptive to a computer apparatus. The power generator includes a logic operating unit, a power converting module and a power management module. The logic operating unit receives a power pulse signal generated by a power button. The logic operating unit generates a power enabling signal according to the power pulse signal. The power converting module is coupled to the logic operating unit, and receives the power enabling signal and generates an internal voltage by converting an external voltage according to the power enabling signal. The power management module is coupled to the logic operating unit and the power converting module, and receives the power pulse signal and latches a generating state of the internal voltage according to the power pulse signal to generate a power stable signal. The power management module further provides the power stable signal to the logic operating unit to maintain a generating state of the power enabling signal.

In an embodiment of the invention, when a voltage level of at least one of the power pulse signal and the power stable signal is a logic high level, the logic operating unit generates the enabled power enabling signal.

In an embodiment of the invention, the logic unit is an OR gate, where a first input terminal of the OR gate receives the power pulse signal, a second input terminal of the OR gate receives the power stable signal, and an output terminal of the OR gate generates the power enabling signal.

In an embodiment of the invention, when the power enabling signal is in an enabling state, the power converting module performs a power converting operation to convert the external voltage to generate the internal voltage.

In an embodiment of the invention, the power management module further receives a reset signal, and the power management module resets the power stable signal according to the reset signal.

In an embodiment of the invention, when the reset signal has a logic low level, the power management module disables the power stable signal.

In an embodiment of the invention, the power management module further generates a plurality of system voltages according to the internal voltage.

The invention provides a computer apparatus including a power button and a power generator. The power button generates a power pulse signal. The power generator includes a logic operating unit, a power converting module and a power management module. The logic operating unit receives the power pulse signal generated by the power button, so as to generate a power enabling signal. The power converting module is coupled to the logic operating unit, and receives the power enabling signal and generates an internal voltage by converting an external voltage according to the power enabling signal. The power management module is coupled to the logic operating unit and the power converting module, and receives the power pulse signal and latches a generating state of the internal voltage according to the power pulse signal to generate a power stable signal. The power management module further provides the power stable signal to the logic operating unit, and the logic operating unit maintains a generating state of the power enabling signal according to the power stable signal.

According to the above descriptions, the invention provides a power generator and a computer apparatus using the power generator, where the power generator includes a logic operating unit to replace the conventional embedded controller to maintain the power enabling signal received by the power converting module to the enabling state, so as to save the resource of the embedded controller of the computer apparatus, and further save an internal configuration space and manufacturing cost of the computer apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
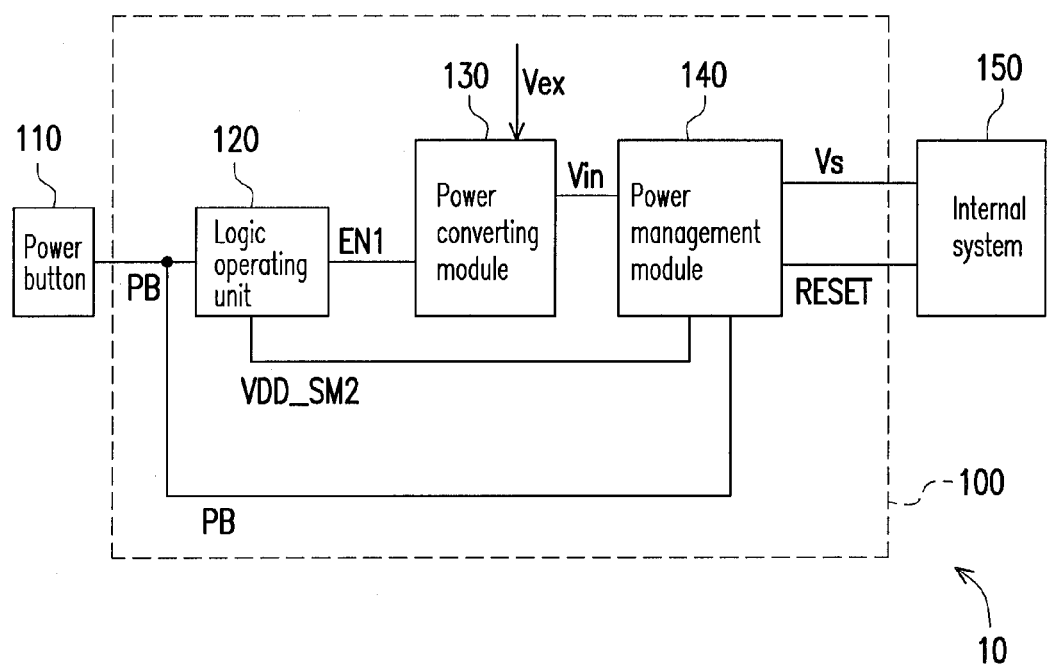
FIG. 1 is a schematic diagram of a computer apparatus 10 according to an embodiment of the invention.

FIG. 1 is a schematic diagram of a computer apparatus 10 according to an embodiment of the invention. Referring to FIG. 1, the computer apparatus 10 includes a power button 110, a power generator 100 and an internal system 150. Further, the power generator 100 includes a logic operating unit 120, a power converting module 130 and a power management module 140.

The logic operating unit 120 is coupled to the power button 110 and the power management module 140, and receives a power pulse signal PB generated by the power button 110 and a power stable signal VDD_SM2 generated by the power management module 140, and the logic operating unit 120 generates a power enabling signal EN1, accordingly.

The power converting module 130 is coupled to the logic operating unit 120, and receives the power enabling signal EN1 and generates an internal voltage Vin by converting an external voltage Vex according to the power enabling signal EN1. Moreover, the power management module 140 is coupled to the logic operating unit 120 and the power converting module 130, and the power management module 140 receives the internal voltage Vin and the power pulse signal PB.

Further, the power management module 140 is coupled to the internal system 150, and provides system voltages Vs to the internal system 150. Moreover, the power management module 140 receives a reset signal RESET from the internal system 150.

In view of a whole operation, when a user presses the power button 110 to start the power generator 100, the power button 110 generates the power pulse signal PB (which, for example, has a logic high level), and transmits the power pulse signal PB to the logic operating unit 120. Then, the logic operating unit 120 generates the power enabling signal EN1 with an enabling state (for example, the power enabling signal EN1 has the logic high level) at an output terminal according to the power pulse signal PB and the received power stable signal VDD_SM2. At this moment, the power converting module 130 performs a power converting operation to convert the external voltage Vex into the internal voltage Vin according to the power enabling signal EN1 with the enabling state.

It should be noticed that at a moment that the power generator 100 is started, the power stable signal VDD_SM2 is in a disabling state (which, for example, has a logic low level). Moreover, the power converting operation executed by the power converting module 130 can be a direct current (DC)-DC power converting operation, for example, the external voltage Vex of 5 volts provided by a battery is converted into the internal voltage Vin.

Certainly, the external voltage Vex provided by the external battery is only an example, and the external voltage Vex can also be provided by a DC power generated by an external power supplier by converting an alternating current, which is not limited by the invention.

Then, the power management module 140 generates a plurality of system voltages Vs according to the internal voltage Vin for providing the power required by the internal system 150. Meanwhile, the power management module 140 latches a generating state of the internal voltage Vin according to the power pulse signal PB to generate the power stable signal VDD_SM2. Namely, when the power management module 140 receives the power pulse signal PB triggered by the user, and simultaneously determines that the internal voltage Vin is generated, the power management module 140 generates the enabled power stable signal VDD_SM2 (which, for example, has the logic high level).

It should be noticed that the system voltages Vs are, for example, 5V, 3.3V, 2.5V, 1.8V and 1V, etc., though the invention is not limited thereto.

In an embodiment of the invention, when a voltage level of at least one of the power pulse signal PB and the power stable signal VDD_SM2 is the logic high level, the logic operating unit 120 generates the enabled power enabling signal EN1 (which, for example, has the logic high level). Therefore, when the power generator 100 is started, i.e. when the power pulse signal PB of the logic high level is triggered, as long as the power management module 140 latches the generating state of the internal voltage Vin, and stably provides the power stable signal VDD_SM2 of the logic high level, the enabling state of the power enabling signal EN1 can be maintained without using an embedded controller after the user starts the power generator 100.

Moreover, the power management module 140 resets the power stable signal VDD_SM2 according to the reset signal RESET received from the internal system 150. In the present embodiment, the reset signal RESET can be low active, namely, when the reset signal RESET has the logic low level, the power management module 140 disables the power stable signal VDD_SM2 (for example, makes the power stable signal VDD_SM2 to have the logic low level).

Figure 2:
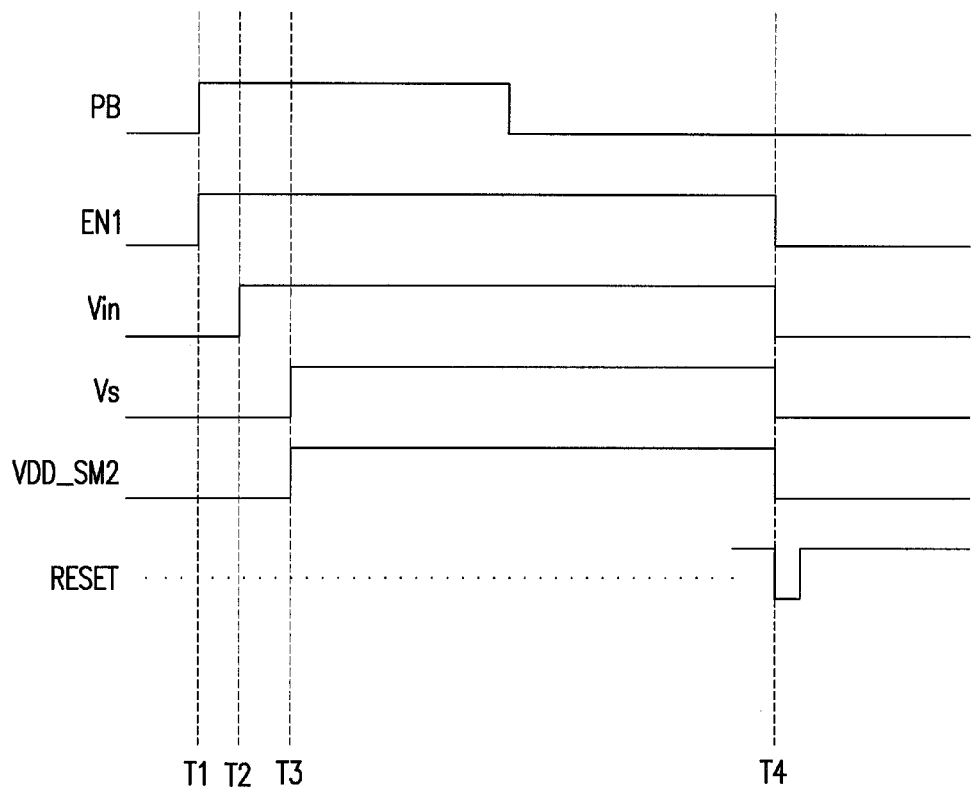
FIG. 2 is an operation waveform diagram of a power generator 100 of the embodiment of FIG. 1.

FIG. 2 is an operation waveform diagram of the power generator 100 of the embodiment of FIG. 1. Referring to FIG. 1 and FIG. 2, when the user presses the power button 110, the power pulse signal PB (which, for example, has the logic high level) is generated at a time point T1. Meanwhile, the logic operating unit 120 enables the power enabling signal EN1 (which, for example, has the logic high level) according to the power pulse signal PB at the time point T1. In response to the power enabling signal EN1 in the enabling state, the power converting module 130 generates the internal voltage Vin at a time point T2. The power management module 140 provides the system voltages Vs to the internal system 150 at a time point T3, and meanwhile generates the power stable signal VDD_SM2 (which, for example, has the logic high level).

Moreover, when the internal system 150 enters a reset state at a time point T4, the reset signal RESET is enabled (which, for example, has the logic low level). Now, the power management module 140 disables the power stable signal VDD_SM2 (which, for example, has the logic low level) in response to the reset signal RESET, so that logic operating unit 120 generates the disabled power enabling signal EN1 (which, for example, has the logic low level), and accordingly the internal voltage Vin and the system voltages Vs are not supplied.

Figure 3:
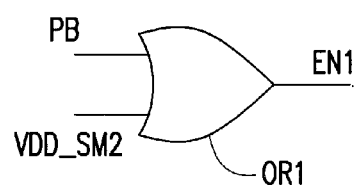
FIG. 3 is a detailed circuit diagram of a logic operating unit 120 of the embodiment of FIG. 1.

FIG. 3 is a detailed circuit diagram of the logic operating unit 120 of the embodiment of FIG. 1. Referring to FIG. 3, according to the waveform diagram of FIG. 2, it is known that the power enabling signal EN1 relates to the power pulse signal PB and the power stable signal VDD_SM2. Namely, when at least one of the power stable signal VDD_SM2 and the power pulse signal PB is in the enabling state (which, for example, has the logic high level), the power enabling signal EN1 is in the enabling state (which, for example, has the logic high level).

On the other hand, when both of the power stable signal VDD_SM2 and the power pulse signal PB are in the disabling state (which, for example, has the logic low level), the power enabling signal EN1 is in the disabling state (which, for example, has the logic low level). Therefore, the logic operating unit 120 can be simply implemented by an OR gate OR1. Further, a first input terminal of the OR gate OR1 receives the power pulse signal PB, a second input terminal of the OR gate OR1 receives the power stable signal VDD_SM2, and an output terminal of the OR gate OR1 outputs the power enabling signal EN1. In this way, a simple logic gate (i.e. the OR gate OR1) can be used to replace the conventional embedded controller to enable the power generator 100.

It should be noticed that a relationship between the enabling and disabling states and between the high and low logic levels is only an example, which is not used to limit a scope of the invention. Those skilled in the art should understand that a relationship between the enabling/disabling state of the logic signal and the presented high/low logic level can be set according to a design requirement. In this case, the logic operating unit 120 of the embodiment of FIG. 3 can be implemented otherwise, and one or a plurality of suitable logic gates can be used to construct the logic operating unit 120 according to the user-defined relationship between the enabling/disabling state of the logic signal and the presented high/low logic level.

In summary, the invention provides the power generator and the computer apparatus using the power generator, where the logic operating unit included in the power generator receives the power pulse signal from the power button, and receives the power stable signal from the power management module, which is generated by the power management module by latching the generating state of the internal voltage, so as to maintain the enabling state of the power enabling signal after the computer apparatus is started, and stably provide the power required by the internal system. In this way, the power generator of the invention can be started without using a controller, which saves a configuration space and manufacturing cost of the computer apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power generator, adaptive to a computer apparatus, comprising:
    a logic operating unit, receiving a power pulse signal generated by a power button, and generating a power enabling signal according to the power pulse signal;
    a power converting module, coupled to the logic operating unit, and receiving the power enabling signal and generating an internal voltage by converting an external voltage according to the power enabling signal; and
    a power management module, coupled to the logic operating unit and the power converting module, and receiving the power pulse signal and latching a generating state of the internal voltage according to the power pulse signal to generate a power stable signal,
    wherein the power management module further provides the power stable signal to the logic operating unit, and the logic operation unit holds a generating state of the power enabling signal according to the power stable signal,
    wherein when a voltage level of at least one of the power pulse signal and the power stable signal is a logic high level, the logic operating unit generates the enabled power enabling signal,
    wherein when the power enabling signal is in an enabling state, the power converting module executes a DC-DC power converting operation to convert the external voltage to generate the internal voltage.

2. The power generator as claimed in claim 1, wherein the logic unit is an OR gate, wherein a first input terminal of the OR gate receives the power pulse signal, a second input terminal of the OR gate receives the power stable signal, and an output terminal of the OR gate generates the power enabling signal.

3. The power generator as claimed in claim 1, wherein the power management module further receives a reset signal, and the power management module resets the power stable signal according to the reset signal.

4. The power generator as claimed in claim 3, wherein when the reset signal has a logic low level, the power management module disables the power stable signal.

5. The power generator as claimed in claim 1, wherein the power management module further generates a plurality of system voltages according to the internal voltage.

6. A computer apparatus, comprising:
    a power button, generating a power pulse signal; and
    a power generator, comprising:
        a logic operating unit, receiving the power pulse signal generated by the power button, and generating a power enabling signal;
        a power converting module, coupled to the logic operating unit, and receiving the power enabling signal and generating an internal voltage by converting an external voltage according to the power enabling signal; and
        a power management module, coupled to the logic operating unit and the power converting module, and receiving the power pulse signal and latching a generating state of the internal voltage according to the power pulse signal to generate a power stable signal,
    wherein the power management module further provides the power stable signal to the logic operating unit to maintain a generating state of the power enabling signal,
    wherein when a voltage level of at least one of the power pulse signal and the power stable signal is a logic high level, the logic operating unit generates the enabled power enabling signal,
    wherein when the power enabling signal is in an enabling state, the power converting module executes a DC-DC power converting operation to convert the external voltage to generate the internal voltage.

7. The computer apparatus as claimed in claim 6, wherein the logic unit is an OR gate, wherein a first input terminal of the OR gate receives the power pulse signal, a second input terminal of the OR gate receives the power stable signal, and an output terminal of the OR gate generates the power enabling signal.

8. The computer apparatus as claimed in claim 6, wherein the power management module further receives a reset signal, and the power management module resets the power stable signal according to the reset signal.

9. The computer apparatus as claimed in claim 8, wherein when the reset signal has a logic low level, the power management module disables the power stable signal.

10. The computer apparatus as claimed in claim 6, wherein the power management module further generates a plurality of system voltages according to the internal voltage.

* * * * *